(12) United States Patent
Walid et al.

(10) Patent No.: US 11,048,596 B2
(45) Date of Patent: Jun. 29, 2021

(54) HIERARCHICAL WEIGHTED CONSENSUS FOR PERMISSIONED BLOCKCHAINS

(71) Applicant: NOKIA TECHNOLOGIES OY, Espoo (FI)

(72) Inventors: Anwar Walid, Watchung, NJ (US); Mohamed Grissa, Corvallis, OR (US)

(73) Assignee: NOKIA TECHNOLOGIES OY, Espoo (FI)

( * ) Notice: Subject to any disclaimer, the term of this patent is extended or adjusted under 35 U.S.C. 154(b) by 248 days.

(21) Appl. No.: 16/220,654

(22) Filed: Dec. 14, 2018

(65) Prior Publication Data

US 2020/0192770 A1 Jun. 18, 2020

(51) Int. Cl.

| | |
|---|---|
| *G06F 11/00* | (2006.01) |
| *G06F 11/14* | (2006.01) |
| *G06F 11/07* | (2006.01) |
| *G06F 11/18* | (2006.01) |
| *H04L 9/06* | (2006.01) |
| *H04L 9/32* | (2006.01) |
| *H04L 29/08* | (2006.01) |

(52) U.S. Cl.
CPC ...... *G06F 11/1482* (2013.01); *G06F 11/0709* (2013.01); *G06F 11/182* (2013.01); *G06F 11/183* (2013.01); *G06F 11/187* (2013.01); *H04L 9/0637* (2013.01); *H04L 9/3247* (2013.01); *H04L 67/10* (2013.01); *G06F 2201/82* (2013.01); *H04L 2209/38* (2013.01)

(58) Field of Classification Search
CPC ............. G06F 11/0709; G06F 11/1482; G06F 11/182; G06F 11/183; G06F 11/187
See application file for complete search history.

(56) References Cited

U.S. PATENT DOCUMENTS

| | | | |
|---|---|---|---|
| 10,722,649 B2 * | 7/2020 | Tang | ............... G16H 20/17 |
| 2018/0341930 A1 | 11/2018 | Moir et al. | |

(Continued)

OTHER PUBLICATIONS

Zyskind, et al., "Decentralizing Privacy: Using Blockchain to Protect Personal Data", 2015 IEE Security and Privacy Workshops, pp. 1-5. (Jul. 20, 2015).

(Continued)

*Primary Examiner* — Joshua P Lottich
(74) *Attorney, Agent, or Firm* — Kramer Amado, P.C.

(57) ABSTRACT

A method of reaching consensus in a blockchain network including a plurality of nodes, including: clustering the nodes into a plurality of sites; randomly selecting a node at each site as a representative; initializing a weight for each node; receiving, by a first representative of a first site, a plurality of transactions received by nodes in the first site; constructing, by the first representative, a first block including the plurality of transactions received by the first representative; performing a weighted consensus mechanism to verify the first block, wherein each of nodes in the first site participates in a weighted Byzantine Fault Tolerant (BFT) consensus mechanism and wherein the consensus is based upon each node's weight; performing a BFT consensus mechanism by the plurality of representatives on the first block; updating each nodes weight; and updating the representative for each site by selecting the node at each site with the highest weight.

24 Claims, 1 Drawing Sheet

(56) References Cited

U.S. PATENT DOCUMENTS

2019/0288993 A1\* 9/2019 Lin ...................... H04L 9/3247
2019/0332702 A1\* 10/2019 Manamohan ......... H04L 9/3239

OTHER PUBLICATIONS

Garg, et al., "The Weighted Byzantine Agreement Problem", 2011 IEEE International Parallel & Distributed Processing Symposium, Anchorage, AK, pp. 524-531. (2011) (doi: 10.1109/IPDPS.2011.57).
Muratov, et al., "YAC: BFT Consensus Algortithm for Blockchain", arxig.org, Cornell University Library, 7 pages. (Sep. 3, 2018) (https://arxiv.org/pdf/1809.00554.pdf).
Extened European Search Report dated May 27, 2020 in European Application No. 19210848.8.

\* cited by examiner

HIERARCHICAL WEIGHTED CONSENSUS FOR PERMISSIONED BLOCKCHAINS

TECHNICAL FIELD

Various embodiments disclosed herein relate generally to hierarchical weighted consensus for permissioned blockchains.

BACKGROUND

The Blockchain paradigm provides a popular mechanism for establishing trust and consensus in distributed environments. While Blockchain technology is currently primarily deployed in crypto-currency systems like Bitcoin and Ethereum, different kinds of information records or transactions can be managed and stored in a Blockchain, and the concept is expected to emerge as a key component of the Internet-of-Things (IoT), enabling novel applications especially in digital health.

The use of blockchain technology in digital health is motivated by some of the inherent limitations of existing health systems which include the fragmented nature of the healthcare ecosystem and the lack of interoperability between the different entities forming this ecosystem, i.e., hospitals, regulators, insurers, patients. Moreover, patients leave their data scattered across several organizations as they move from one provider to another. All of this creates what is known as "silo effect", as patients' data are siloed with lack of medical information and records of patient flowing between these entities. There is also no redundancy mechanism to replicate the medical records of the patients making them vulnerable to loss or attacks like ransomware. Another issue is that the mechanisms being used do not provide immutable storage of these records, which means that these records are not tamper resistant, creating the need for non-repudiation and audit mechanisms to guarantee the immutability of the data. Blockchain technology seems to be a perfect solution to the above-mentioned inherent limitations of existing health systems. It noted that the data storage and data integrity issues present are found in other areas as well such as financial systems, production facilities, supply chains, etc.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of reaching consensus in a blockchain network including a plurality of nodes, including clustering the nodes into a plurality of sites; randomly selecting a node at each site as a representative; initializing a weight for each node; receiving, by a first representative of a first site, a plurality of transactions received by nodes in the first site; constructing, by the first representative, a first block including the plurality of transactions received by the first representative; performing a weighted consensus mechanism to verify the first block, wherein each of nodes in the first site participates in a weighted Byzantine Fault Tolerant (BFT) consensus mechanism and wherein the consensus is based upon each node's weight; performing a BFT consensus mechanism by the plurality of representatives on the first block; updating each nodes weight; and updating the representative for each site by selecting the node at each site with the highest weight.

Various embodiments are described, wherein the weighted BFT consensus mechanism further includes: selecting a set of honest nodes such that the set of honest nodes is the minimum number of nodes whose sum of weights exceeds the sum of the weights of the faulty nodes; performing a first phase that produces a preliminary vote for each node at the site based upon the weighted votes of other nodes at the site; performing a second phase that produces an intermediate vote for each node at the site based upon the weighted preliminary votes of the other nodes at the site; and performing a third phase that produces a final vote for the site based upon the preliminary votes of the honest nodes.

Various embodiments are described, further including producing a digital signature for the final vote using a decentralized witness cosigning protocol.

Various embodiments are described, further including adding nodes to a faulty set when no message or a message with an incorrect format is received from the nodes.

Various embodiments are described, wherein updating each nodes weight further including: performing a first phase where all of the nodes in the site exchange a list of faulty nodes and then each node updates its list of faulty nodes based upon a suspect weight that is a sum of the weights all nodes that lists a node as faulty; performing a second phase wherein the nodes at the site reach an agreement of the set of faulty nodes using the weighted consensus mechanism; and performing a third phase that reduces the weights of the nodes in the set of faulty nodes and normalizes the weights of the other nodes.

Various embodiments are described, wherein reducing the weights of the nodes in the set of faulty nodes includes setting the weights to zero.

Various embodiments are described, further including: receiving, by a second representative of a second site, a plurality of transactions received by nodes in the second site; constructing, by the second representative, a second block including the plurality of transactions received by the second representative; performing a weighted consensus mechanism to verify the second block, wherein each of nodes in the second site participates in a weighted Byzantine Fault Tolerant (BF) consensus mechanism and wherein the consensus is based upon each node's weight; performing a BFT consensus mechanism by the plurality of representatives on the second block; updating each nodes weight; and updating the representative for each site by selecting the node at each site with the highest weight.

Various embodiments are described, wherein the weights on each node allow for more than 1/3 of the nodes in the network to be faulty.

Further various embodiments relate to a non-transitory machine-readable storage medium encoded with instructions for reaching consensus in a blockchain network including a plurality of nodes, including: instructions for clustering the nodes into a plurality of sites; instructions for randomly selecting a node at each site as a representative; instructions for initializing a weight for each node; instructions for receiving, by a first representative of a first site, a plurality of transactions received by nodes in the first site; instructions for constructing, by the first representative, a first block including the plurality of transactions received by the first representative; instructions for performing a weighted consensus mechanism to verify the first block, wherein each of nodes in the first site participates in a weighted Byzantine Fault Tolerant (BFT) consensus mechanism and wherein the consensus is based upon each node's weight; instructions for performing a BFT consensus mechanism by the plurality of representatives on the first block; instructions for updating each nodes weight; and instructions for updating the representative for each site by selecting the node at each site with the highest weight.

Various embodiments are described, wherein the weighted BFT consensus mechanism further includes: instructions for selecting a set of honest nodes such that the set of honest nodes is the minimum number of nodes whose sum of weights exceeds the sum of the weights of the faulty nodes; instructions for performing a first phase that produces a preliminary vote for each node at the site based upon the weighted votes of other nodes at the site; instructions for performing a second phase that produces an intermediate vote for each node at the site based upon the weighted preliminary votes of the other nodes at the site; and instructions for performing a third phase that produces a final vote for the site based upon the preliminary votes of the honest nodes.

Various embodiments are described, further including instructions for producing a digital signature for the final vote using a decentralized witness cosigning protocol.

Various embodiments are described, further including instructions for adding nodes to a faulty set when no message or a message with an incorrect format is received from the nodes.

Various embodiments are described, wherein instructions for updating each nodes weight further includes: instructions for performing a first phase where all of the nodes in the site exchange a list of faulty nodes and then each node updates its list of faulty nodes based upon a suspect weight that is a sum of the weights all nodes that lists a node as faulty; instructions for performing a second phase wherein the nodes at the site reach an agreement of the set of faulty nodes using the weighted consensus mechanism; and instructions for performing a third phase that reduces the weights of the nodes in the set of faulty nodes and normalizes the weights of the other nodes.

Various embodiments are described, wherein reducing the weights of the nodes in the set of faulty nodes includes setting the weights to zero.

Various embodiments are described, further including: instructions for receiving, by a second representative of a second site, a plurality of transactions received by nodes in the second site; instructions for constructing, by the second representative, a second block including the plurality of transactions received by the second representative; instructions for performing a weighted consensus mechanism to verify the second block, wherein each of nodes in the second site participates in a weighted Byzantine Fault Tolerant (BFT) consensus mechanism and wherein the consensus is based upon each node's weight; instructions for performing a BFT consensus mechanism by the plurality of representatives on the second block; instructions for updating each nodes weight; and instructions for updating the representative for each site by selecting the node at each site with the highest weight.

Various embodiments are described, wherein the weights on each node allow for more than ⅓ of the nodes in the network to be faulty.

Further various embodiments relate to a system for reaching consensus in a blockchain network including a plurality of nodes, including: means for clustering the nodes into a plurality of sites; means for randomly selecting a node at each site as a representative; means for initializing a weight for each node; means for receiving, by a first representative of a first site, a plurality of transactions received by nodes in the first site; means for constructing, by the first representative, a first block including the plurality of transactions received by the first representative; means for performing a weighted consensus mechanism to verify the first block, wherein each of nodes in the first site participates in a weighted Byzantine Fault Tolerant (BFT) consensus mechanism and wherein the consensus is based upon each node's weight; means for performing a BFT consensus mechanism by the plurality of representatives on the first block, means for updating each nodes weight; and means for updating the representative for each site by selecting the node at each site with the highest weight.

Various embodiments are described, further including wherein the weighted BFT consensus mechanism further includes: means for selecting a set of honest nodes such that the set of honest nodes is the minimum number of nodes whose sum of weights exceeds the sum of the weights of the faulty nodes; means for performing a first phase that produces a preliminary vote for each node at the site based upon the weighted votes of other nodes at the site; means for performing a second phase that produces an intermediate vote for each node at the site based upon the weighted preliminary votes of the other nodes at the site; and means for performing a third phase that produces a final vote for the site based upon the preliminary votes of the honest nodes.

Various embodiments are described, further including means for producing a digital signature for the final vote using a decentralized witness cosigning protocol.

Various embodiments are described, further including means for adding nodes to a faulty set when no message or a message with an incorrect format is received from the nodes.

Various embodiments are described, wherein means for updating each nodes weight further includes: means for performing a first phase where all of the nodes in the site exchange a list of faulty nodes and then each node updates its list of faulty nodes based upon a suspect weight that is a sum of the weights all nodes that lists a node as faulty; means for performing a second phase wherein the nodes at the site reach an agreement of the set of faulty nodes using the weighted consensus mechanism; and means for performing a third phase that reduces the weights of the nodes in the set of faulty nodes and normalizes the weights of the other nodes.

Various embodiments are described, wherein means for reducing the weights of the nodes in the set of faulty nodes includes means for setting the weights to zero.

Various embodiments are described, further including: means for receiving, by a second representative of a second site, a plurality of transactions received by nodes in the second site; means for constructing, by the second representative, a second block including the plurality of transactions received by the second representative; means for performing a weighted consensus mechanism to verify the second block, wherein each of nodes in the second site participates in a weighted Byzantine Fault Tolerant (BFI) consensus mechanism and wherein the consensus is based upon each node's weight; means for performing a BFT consensus mechanism by the plurality of representatives on the second block; means for updating each nodes weight; and means for updating the representative for each site by selecting the node at each site with the highest weight.

Various embodiments are described, wherein the weights on each node allow for more than ⅓ of the nodes in the network to be faulty.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

An important component of any blockchain system is its consensus mechanism, which orchestrates how the different nodes of the blockchain network reaches an agreement about transactions and blocks that are to be added to the shared ledger in a disturbed manner. The most popular mechanism for consensus is proof-of-work, which is usually used in permissionless blockchains, such as cryptocurrencies where access is publicly open, and identities are hidden, to eliminate the need for established trust between the nodes as this concept limits the ability of the nodes to misbehave. Through the proof-of-work consensus mechanism each node needs to prove that it spent a large amount of computational resources and solve a mathematical cryptographic puzzle to gain the right to add its block.

However, access in healthcare and certain other applications must be authenticated, which means that all the nodes need to be aware of the identities of the other entities in the system. Therefore, it is unnecessary for nodes to spend tremendous computational resources to prove their eligibility to write into the blockchain as it would be a waste of energy resources. In addition, PoW is a slow consensus mechanism with a low transaction rate. The PoW consensus mechanism is also probabilistic, which means that even if a node solves the puzzle, the node is not guaranteed that its block will be added to the blockchain, which also causes the node to suffer from a very low transaction rate. These limitations make the PoW consensus mechanism unsuitable for healthcare and other similar systems. Therefore, there remains a need to design a consensus mechanism that enables health, and other similar systems as well, to leverage the potential and properties of blockchain technology while addressing the above-identified issues.

Due to the authenticated access requirement in health systems and due to the fact that nodes in a healthcare system are more likely to be altruistic than is the case in cryptocurrency like systems, it makes more sense to rely on node's votes and a permissioned type of consensus, more specifically Byzantine Fault Tolerance (BF) protocols, to implement a consensus mechanism for healthcare and other similar systems. BFT protocols enable distributed systems, like blockchain networks, to tolerate byzantine failure, which is the most difficult class of failures, among the nodes. BFT protocols present several advantages compared to their PoW consensus counterpart. First, the BFT protocol's permissioned nature makes them more suitable to healthcare systems and waives the requirement of using large amounts of computational power to establish trust as in the PoW consensus mechanism. Second, unlike PoW, BFT consensus is deterministic, meaning that once consensus about a certain block is reached, then that block is permanently added to the blockchain. Finally, blockchain systems relying on BFT protocols as their consensus mechanism enjoy much higher transactions rates compared to their PoW counterparts, which would be very beneficial in healthcare and other similar systems where data may need to propagate rapidly, especially in emergency situations.

As mentioned above, the several benefits that BFT protocols present make them very attractive to be used in healthcare and other similar blockchains. However, these benefits come at the cost of an exorbitant communication overhead as every node needs to communicate with every other node in the system over multiple rounds. This limits the BFT's scalability and high transaction rates to only small systems. Also, BFT protocols can tolerate only up to ⅓ of the nodes turning byzantine. Therefore, applying BFT protocols off the shelf to healthcare and other similar systems is not possible as the number of nodes pertaining to healthcare and other similar systems is much larger than what BFT protocols support. Also, healthcare and other similar systems are some of the most targeted systems by attackers, which increases the chances of the nodes being compromised and turning byzantine—thus the need to improve the systems fault tolerance to these byzantine faults.

The embodiments described herein address these two issues to create a BFT protocol that not only scales better to large systems such as healthcare systems, but also has better fault tolerance than the theoretical limit of ⅓ of the total number of nodes.

An embodiment of a consensus mechanism will not be described. The consensus mechanism is a BFT-based consensus mechanism for permissioned blockchains, that is suitable for healthcare and other systems, for example, wherein entities pertaining to the health ecosystem, i.e., hospitals, patients, care providers, insurance companies, could be involved in this consensus. This consensus mechanism achieves better scalability and better fault tolerance than the standard BFT consensus mechanism.

The consensus mechanism represents the main control component in any blockchain system. In fact, the consensus mechanism enables entities belonging to the system to reach an agreement on what block, and thus what transactions, will be validated and added to the blockchain. In healthcare applications all parties must have permissions to be part of the system and their identities are known to each other. Therefore, it is natural to choose a permissioned blockchain and to use a BFT-based protocol as the consensus engine. This is different from permissionless blockchains where membership is open to the public as in cryptocurrencies such as Bitcoin, where consensus is established via mechanisms like the computationally costly proof-of-work.

Figure 1:
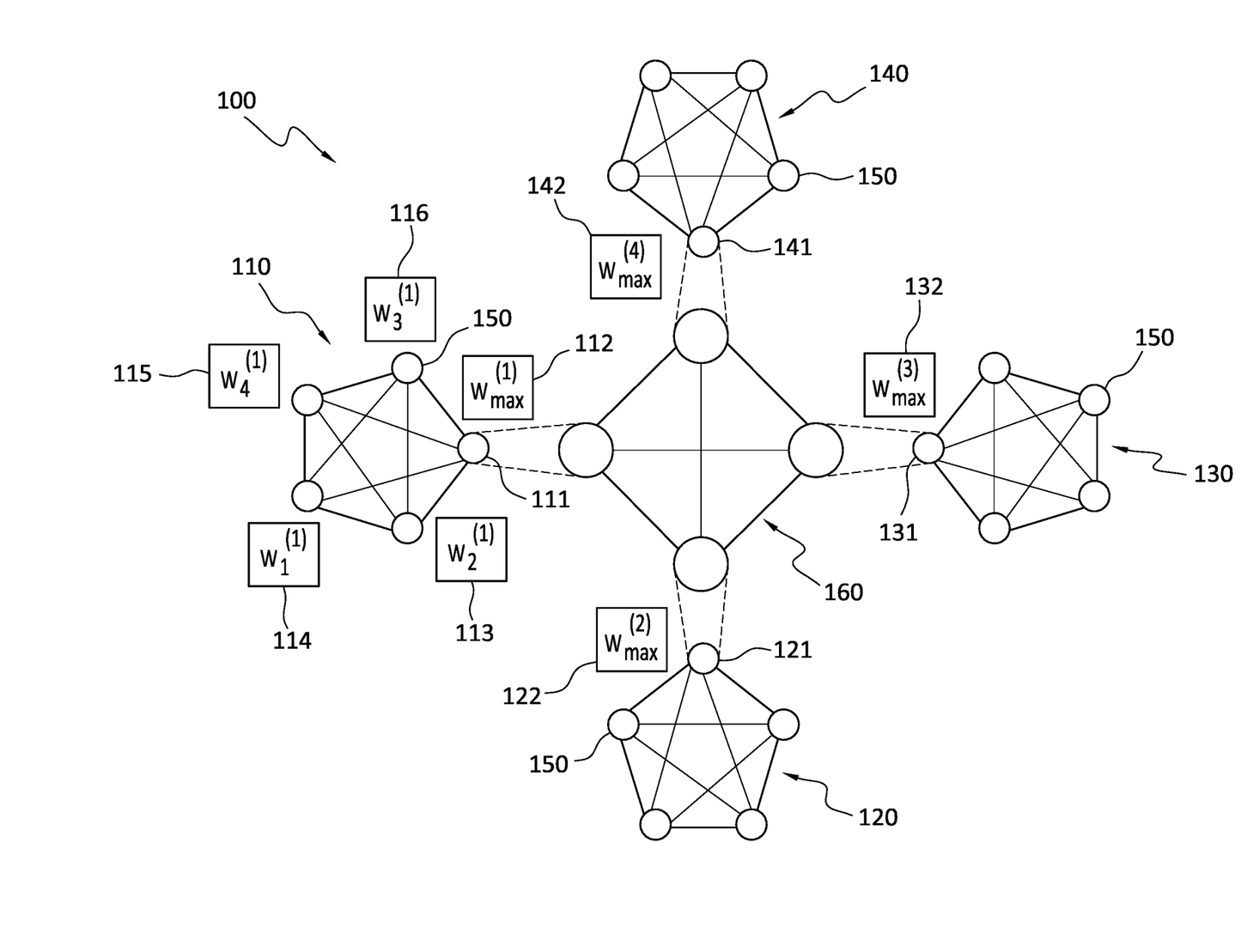
FIG. 1 illustrates a system with nodes that is clustered into s clusters sites, based on the location of the nodes.

For illustration purposes the nodes in the system described herein are referred to as hospitals, but they can also include other entities from the health ecosystem. As previously stated, a healthcare based blockchain system is described, but the consensus mechanism embodiments described herein may be used in other systems that are similar to healthcare systems. Patients may also join the consensus with appropriate weights and incentives and be part of the protocol. The proposed BFT-based consensus mechanism makes use of two key concepts to achieve high transaction rates and increased fault tolerance: hierarchy and weights. BFT protocols in general are known for their poor scalability which is mainly due to their large communication overhead. This challenge is addressed by proposing a hierarchical BFT, where instead of making all the nodes participate simultaneously in the consensus, the nodes are organized into smaller groups and run parallel consensus instances. Once consensus is reached within each group, a global consensus is run between representatives of the different groups. This helps to reduce the large number of messages that are exchanged in common BFT protocols, which in turn reduces delays and increases the transaction rates of the system. In fact, if no hierarchy is in place, a regular BFT mechanism would incur an $O(n^2)$ communication overhead, as every node would communicate with every other node in the system over multiple rounds to reach consensus. FIG. 1 illustrates a system with nodes that is clustered into s clusters sites, based on the location of the nodes. In this example, the system 100 includes 20 nodes 150. Then nodes 150 are clustered into four sites 110, 120, 130, 140 where each site has 5 nodes 150. Each site 110, 120, 130, 140 has a representative 111, 121, 131, 141 respectively whose role will be further described below. The representatives 111, 121, 131, 141 form a site representative network 160. Each node is assigned a weight and specific weights 112, 113, 114, 115, 116, 122, 132, 142 are identified in the system 100. The operation of the system will be described in further detail below.

The consensus mechanism is executed in a hierarchical manner such that communication overhead will drop dramatically from $O(n^2)$ to approximately $O(s^2)$. This reduction in message exchange overhead will be especially important in wide area applications, where the clusters are located far apart leading to a reduction in consensus delay and improved transaction rate.

The weights are dynamically assigned to the different entities, i.e., each node will have a weight of $w_i$ where i indicates a specific node of the system. The weights $w_i$ serve two purposes. First, for each group a leader and representative is elected which is the hospital that has the highest weight in each. The group leaders and representatives then participate together in the global and final round of consensus. Second, the weights serve as a mechanism to penalize malicious nodes whose votes do not match the global vote, and the weights eventually eliminate these malicious nodes from the system. Incorporating weights in the BFT consensus has another important benefit as it improves resiliency to faults in terms of the number of nodes in the system that can turn byzantine. In fact, regular BFT protocols can tolerate up to ⅓ of the nodes to be malicious, while the weighted consensus protocol can tolerate a greater number of malicious nodes as long as their combined weight is not more than ⅓ of the total weight. Incorporation of weights in the consensus protocol is based on the King BFT algorithm proposed in: Vijay K Garg and John Bridgman, The weighted byzantine agreement problem, In Parallel & Distributed Processing Symposium (IPDPS), 2011 IEEE International, pages 524-531, IEEE, 2011, which is hereby incorporated by reference for all purposes as if fully set forth herein.

The consensus mechanism has two phases: an initialization phase that is executed only once; and the hierarchical BFT phase that is executed every consensus iteration. Algorithm 1 Hierarchical Weighted BFT is illustrated below using pseudo-code. The Hierarchical Weighted BFT is shown as having 22 lines of pseudo code. In the initialization phase (lines 1-5), the health system is composed of n hospitals $h_j$ that are clustered into s sites $\mathcal{H}_1, \ldots, \mathcal{H}_s$ based on their geographical locations as depicted. It is assumed that each cluster or site $\mathcal{H}_i$ contains $n_i=3f_i+1$ hospitals, where $f_i$ represents the byzantine fault tolerance level of site $\mathcal{H}_i$ (line 2). A representative $h_r^{(i)}$ from each site $\mathcal{H}_i$ is picked at random to coordinate consensus locally and with the other sites in the system (line 4). This set of representatives forms a set $\mathcal{R}_t$ at iteration t. Initially, all hospitals in each site are assigned equal weights $w_i$ (line 5). At each iteration t of the protocol, the weights $w_i$ of the different set of representatives of all sites may be updated to eliminate misbehaving nodes and elect the hospital with the highest weight at each site (line 22) to be the representative/leader of its corresponding site. If two or might sites have equal weights, then representative may be selected in a round robin manner among those sites.

In the hierarchical BFT phase (lines 6-22), which represents the core of the consensus mechanism, a leader site $\mathcal{H}_L$ is selected in a round robin fashion from among representatives $h_r^{(i)}$ from each site $\mathcal{H}_i$. This is done to allow each site to push the transactions that were received from entities belonging to the site to be included in the shared ledger. A client $c^{(i)}$, that could be a patient or a doctor for instance, located at site $\mathcal{H}_i$ sends a transaction $T^{(i)}$ to one of the hospitals in the same site (line 6), which in turn forwards it to the representative $h_r^{(i)}$ of the site $\mathcal{H}_i$ (line 7). The representative $h_r^{(i)}$ forwards the transaction TC to the representative $h_r^{(L)}$ of the leading site $H_L$, which collects all transactions that were sent to it from all representatives of other sites (line 7). The representative $h_r^{(L)}$ constructs a block $B_t^{(L)}$ with these transactions (line 9). The representative $h_r^{(L)}$ then proposes block $B_t^{(L)}$ to the hospitals in its site to reach consensus on it locally within $\mathcal{H}_L$ using the King subroutine of Algorithm 2, which will be described below. The nodes in the site will collectively run the King algorithm which returns the final vote $v_t^{(L)}$ of those nodes along with a digital signature $\sigma_{v_t^{(L)}}$ collectively computed over the final vote using a decentralized witness cosigning protocol such as Cosi (see Ewa Syta, Iulia Tamas, Dylan Visher, David Isaac Wolinsky, Philipp Jovanovic, Linus Gasser, Nicolas Gailly, Ismail Khoffi, and Bryan Ford, Keeping authorities honest or bust with decentralized witness cosigning, In Security and Privacy (SP), 2016 IEEE Symposium on, pages 526-545. IEEE, 2016.) Now if the final vote is equal to 1 (line 12), the representative $h_r^{(L)}$ of the leader site will forward the block $B_t^{(L)}$ (line 13), that was validated by the nodes of site $H_L$, to the representatives $h_r^{(i)}$ (excluding $h_r^{(L)}$) of the other sites in the system, to run a consensus mechanism locally and in parallel with hospitals in their corresponding sites using the King algorithm (lines 14 and 15). Once all of the sites, except for $\mathcal{H}_L$, reach consensus locally on block $B_t^{(L)}$, then another round of consensus is run globally using a benign BFT protocol (line 16) between site representatives to reach final consensus on the block. If the block is also validated by the final benign consensus mechanism (line 17), then the block gets added to the blockchain (line 18), and the weights $w_i$ of all the hospitals in the system are updated via the UpdateWeights subroutine illustrated in Algorithm 3. Based on these updated weights $w_i$, the set of representatives is also updated via the UpdateRepresentatives subroutine of Algorithm 4, which returns a new set of representatives $R_{t+1}$ that will be used in the next round of the hierarchical consensus protocol.

Further, the client $c^{(i)}$ should receive a confirmation from the system that their transaction was successfully added to the blockchain. After a specific duration, if no confirmation is received, the client will resubmit the transaction to another hospital in $\mathcal{H}_i$, and will report the hospital that did not forward its transaction to the system (lines 19 and 20).

Algorithm 1 Hierarchical Weighted BFT

Initialization:

1: A set of n hospitals $\mathcal{H} = h_1, \ldots, h_n$ is clustered into s sites $\mathcal{H}_1, \ldots, \mathcal{H}_s$.
2: Each site $\mathcal{H}_i$ has $n_i = 3f_i + 1$ hospitals, where $f_i$ is the fault tolerance level of cluster $\mathcal{H}_i$, $\forall$ i = 1, ..., s
3: Each site $\mathcal{H}_i$ has a representative $h_r^{(i)}$ picked at random to coordinate consensus with other sites.
4: Let $\mathcal{R}_t = \{h_r^{(1)}, \ldots, h_r^{(s)}\}$ be the set of representatives at consensus iteration t
5: $w_i$: array[1, ..., $n_i$] of weights assigned to $\{h_j^{(i)}\}_{j=1}^{hospNbr_i}$ s.t. initially the weights are equal, and $\forall j$, $w_i[j] \geq 0$ $\wedge$ ($\Sigma_j w_i[j] = 1$), $\forall$ i = 1, ..., s    ▷ All $h_j^{(i)}$'s are aware of the weights of all other $h_j^{(i)}$'s in $\mathcal{H}_i$
   Hierarchical BFT: Each Consensus iteration t, a leader site $\mathcal{H}_L$ is selected in a round robin fashion 6: Client $c^{(i)}$ located at $\mathcal{H}_i$ sends a transaction $T^{(i)}$ to a hospital in $\mathcal{H}_i$
7: $T^{(i)}$ is forwarded to site $\mathcal{H}_i$'s representative $h_r^{(i)}$
8: $h_r^{(i)}$ forwards $T^{(i)}$ to the leading site $\mathcal{H}_L$'s representative $h_r^{(L)}$
9: $h_r^{(L)}$ constructs a block $B_t$ that includes all the transactions that it received from the different representatives
10: $h_r^{(L)}$ proposes $B_t^{(L)}$ to $\{h_j^{(L)}\}_{j=1}^{n_L}$
11: $(v_t^{(L)}, \sigma_{v_t^{(L)}}) \leftarrow$ King($h_r^{(L)}$, $\mathcal{H}_L$, $B_t$, 1)
12: if $v_t^{(L)} == 1$ then
13:   $h_r^{(L)}$ forwards $B_t^{(L)}$ to representatives of other sites $\{h_r^{(i)}\}_{i=1, i \neq L}^s$
14:   for $\mathcal{H}_i \in \mathcal{H} \setminus \mathcal{H}_L$ do
15:     $(v_t^{(i)}, \sigma_{v_t^{(i)}}) \leftarrow$ King($h_r^{(i)}$, $\mathcal{H}_i$, $B_t^{(L)}$, 1)
16:   $v_t^C \leftarrow$ BenignBFT($h_r^{(L)}$, $\mathcal{R}_t$, $B_t^{(L)}$)
17:   if $v_t^C == 1$ then
18:     $B_t^{(L)}$ is added to the blockchain
19: if $c^{(i)}$.timeout == True then
20:   $c^{(i)}$ resubmits its transaction to another hospital and reports the other as faulty.
21: UpdateWeights($\mathcal{H}$)
22: $\mathcal{R}_{t+1} \leftarrow$ UpdateRepresentatives ($\mathcal{H}, \mathcal{R}_t$)

Next, the weighted King algorithm (see Algorithm 2 below) that represents the underlying BFT algorithm of Hierarchical BFT approach described herein and that is executed within each site.

The representative of the site, $h_r^{(i)}$, which is also the leader of that site, starts broadcasting the block $B_t$ being voted on at consensus iteration t to all of the hospitals in the site (line 1). A minimum number, $\alpha_\rho^{(i)}$, of honest nodes in $\mathcal{H}_i$, including the site representative $h_r^{(i)}$, that have their total weight exceeding the weight $\rho_i$ of faulty hospitals from previous iterations, are picked to play the role of "kings" in the algorithm (lines 2 and 3). The algorithm goes through three phases phase 1 (lines 7-15), phase 2 (lines 16-26), and phase 3 (lines 27-35), and the final vote outcome over a block may be one of two possible values: 0 means the block is not approved, and 1 means the block is valid. Only hospitals with positive weight will be able to participate in the protocol which keeps record of the weight vector $w_i$ of all nodes in $\mathcal{H}_i$ (lines 7 and 17). The King subroutine loops through each hospital $h_j^{(i)}$ and then loops through each of the "kings."

In phase 1, each hospital with positive weight shares its initial vote, which could be 0 or 1, with all the hospitals in the site (line 7). Then each hospital $h_j^{(i)}$ will check the votes that it received, including its own, which are also digitally signed (line 8). If a hospital $h_j^{(i)}$ notices that one or more hospitals did not send their votes, or if other hospitals sent a message with a wrong format, then hospital $h_j^{(i)}$ will add those hospitals to its preliminary set of faulty nodes faultySet$_j^{(i)}$ (lines 9 and 10). Based on the different votes that the hospital $h_j^{(i)}$ collected and using the weights of the corresponding hospitals, the total weight of each possible vote is calculated for the hospital $h_j^{(i)}$ (lines 11 and 12). If one of the two possible outcomes has a total weight greater than ⅔ (since the fault tolerance threshold is ⅓) then the node will change its vote to that value and will use it for the second phase of the algorithm (lines 13 and 14). Otherwise, the node will use undecided as its vote for the next phase (line 15).

In phase 2, the same process is repeated but with the new votes to take into consideration the decisions of the other nodes in the site. In this phase, as opposed to phase 1, a node can propose undecided as its vote (line 26), which means that the node is undecided about whether to validate or reject this block and will wait until it sees the decision of the leader to make its own decision. At the end of this phase, each hospital $h_j^{(i)}$ will check if one of the three possible votes has a larger total weight than the others and will pick it as its final vote and use it in the third and final phase (lines 24-26).

In phase 3, only the king of the current iteration broadcasts its vote, denoted as kingvalue$^{(i)}$, to the remaining nodes in the site $\mathcal{H}_i$ (line 27). Each hospital receives kingvalue and makes a decision (lines 27-35). If the hospital is undecided or the weight stored in myweight from phase 2 is less than ⅔, then the hospital sets its final decision v to kingvalue only if kingvalue is not undecided, and sets it to 1 if kingvalue is undecided (lines 29-31). However, if the hospitals weight is greater than ⅔ and its vote is not undecided, then it will consider its vote as the final vote (lines 32 and 35). If this hospital notices that the king's value is different from its preference, it will add the king to its list of faulty nodes for the next round of the protocol (lines 33 and 34).

The algorithm will keep going through $\alpha_\rho^{(i)}$ rounds executing the three phases that we explained above, but each time with a different king from set ind$^{(i)}$. Doing this will guarantee that there is at least one round in which one king is correct.

Algorithm 2 King($h_r^{(i)}\mathcal{H}_i$, $B_t$, v): initiated by $h_r^{(i)}$ with a vote v: {0, 1} over $\mathcal{H}_i$ to reach consensus on block $B_t$ 1:   $h_r^{(i)}$ broadcasts $B_t$ to all $\{h_j^{(i)}\}_{j=1}^{n_i}$ for voting 2:
$$\alpha_\rho^{(i)} \leftarrow 1 + \min\left\{m \left| \left(\sum_{j=1}^m w_i[j]\right) + w_i[r] > \rho_i \right.\right\}$$

where $\rho_i$ is the sum of weights of all failed $h_j^{(i)}$s ⊳ $\rho_i < 1/3$ 3:   $\text{ind}^{(i)} \leftarrow$ set of $h_j^{(i)}$s corresponding to $\alpha_\rho^{(i)}$ including $h_r^{(i)}$
4:   for j = 1, ..., $n_i$ do
5:     for k ∈ $\text{ind}^{(i)}$ do
6:       $S_0 = 0, S_1 = 0, S_u = 0$     Phase 1

7:       if ($w_i[j] > 0$) then $h_j^{(i)}$ sends $\text{myvote}_j^{(i)}$ to all $\{h_j^{(i)}\}_{j=1}^{n_i}$
8:       for all l s.t. $w_i[l] > 0$ do
9:         if $h_j^{(i)}$ receives no/wrong message from $h_l^{(i)}$ then
10:           $\text{faultySet}_j^{(i)} \leftarrow \text{faultySet}_j^{(i)} \cup \{\ell\}$
11:         else if $h_j^{(i)}$ receives 1 from $h_l^{(i)}$ then $S_1 \leftarrow S_1 + w_i[l]$
12:         else if $h_j^{(i)}$ receives 0 from $h_l^{(i)}$ then $S_0 \leftarrow S_0 + w_i[l]$
13:       if $S_0 \geq 2/3$ then $\text{myvote}_j^{(i)} \leftarrow 0$
14:       else if ($S_1 \geq 2/3$) then $\text{myvote}_j^{(i)} \leftarrow 1$
15:       else $\text{myvote}_j^{(i)} \leftarrow$ undecided     Phase 2

16:       $S_0 = 0, S_1 = 0, S_u = 0$
17:       if ($w_i[j] > 0$) then $h_j^{(i)}$ sends $\text{myvote}_j^{(i)}$ to all $\{h_j^{(i)}\}_{j=1}^{n_i}$
18:       for all l s.t. $w_i[l] > 0$ do
19:         if $h_j^{(i)}$ receives no/wrong message from $h_l^{(i)}$ then
20:           $\text{faultySet}_j^{(i)} \leftarrow \text{faultySet}_j^{(i)} \cup \{\ell\}$
21:         else if $h_j^{(i)}$ receives 1 from $h_l^{(i)}$ then $S_1 \leftarrow S_1 + w_i[l]$
22:         else if $h_j^{(i)}$ receives 0 from $h_l^{(i)}$ then $S_0 \leftarrow S_0 + w_i[l]$
23:         else $S_u \leftarrow S_u + w_i[l]$
24:       if ($S_0 > 1/3$) then $\text{myvote}_j^{(i)} \leftarrow 0$; $\text{myweight}_j^{(i)} \leftarrow S_0$
25:       else if ($S_1 > 1/3$) then $\text{myvote}_j^{(i)} \leftarrow 1$; $\text{myweight}_j^{(i)} \leftarrow S_1$
26:       else if ($S_u > 1/3$) then $\text{myvote}_j^{(i)} \leftarrow$ undecided; $\text{myweight}_j^{(i)} \leftarrow S_u$     Phase 3

27:       if (k = j) then $h_k^{(i)}$ sends $\text{myvote}_k^{(i)}$ to $\{h_j^{(i)}\}_{j=1,j\neq k}^{n_i}$ as $\text{kingvalue}^{(i)}$
28:       $\{h_j^{(i)}\}_{j=1,j\neq k}^{n_i}$ receive $\text{kingvalue}^{(i)}$ from $h_k^{(i)}$
29:       if ($\text{myvote}_j^{(i)}$ = undecided or $\text{myweight}_j^{(i)} < 2/3$) then
30:         if ($\text{kingvalue}^{(i)}$ = undecided) then v = 1
31:         else v = $\text{kingvalue}^{(i)}$
32:       else if ($\text{myvote}_j^{(i)} \neq$ undecided and $\text{myweight}_j^{(i)} \geq 2/3$) then
33:         if $\text{myvote}_j^{(i)} \neq \text{kingvalue}^{(i)}$ then
34:           $\text{faultySet}_j^{(i)} \leftarrow \text{faultySet}_j^{(i)} \cup \{k\}$
35:         v ← $\text{myvote}_j^{(i)}$
36:   $h_j^{(i)}$s collectively compute digital signature $\sigma_v$ using a Decentralized Witness Cosigning protocol (e.g. CoSi)
37:   Output (v, $\sigma_v$) as the decided value As the consensus mechanism needs to be run multiple times, it becomes natural to keep track of how each of the nodes behaves for each execution of the BFT protocol. This is done via the UpdateWeights subroutine which is illustrated in Algorithm 3 (see below). The algorithm includes three phases phase 1 (lines 4-11), phase 2 (lines 12-15), and phase 3 (lines 16-21). The UpdateWeights subroutine initializes to the empty set a variable consensuFaulty which is the set of all agreed to faulty nodes (line 1). The algorithm then loops through each hospital $h_j^{(i)}$ (line 2). The algorithm then initializes suspectWeight hashmap for each iteration of the loop (line 3). The first phase, which is a learning phase, all hospitals with positive weights broadcast their faultySets to all remaining hospitals in the site (lines 4 and 5), so that they can all learn about faulty nodes from other hospitals (lines 6 and 7). Each hospital keeps updating the suspectWeight hashmap, which is indexed by the IDs of the hospitals, by assigning a weight for each suspect node that was included in the faulty set of one or more hospitals (lines 8 and 9). This weight corresponds to the total weight of the nodes that agreed that a specific hospital is faulty. If a hospital $h_j^{(i)}$ notices that a suspect hospital $h_k^{(i)}$ was voted to be faulty by some other hospitals with total weight of at least 1/3, it then it adds that hospital to its faultySet (lines 10 and 11). This will guarantee that $h_k^{(i)}$ is included in the faultySet of at least one honest hospital.

The second phase (lines 12-15), enables all the hospitals to reach an agreement on the set of faulty hospitals denoted as consensusFaulty, which is the same at all correct nodes.

Finally, in phase 3, the weight of the faulty nodes belonging to consensusFaulty is set to zero to punish them for their behavior and eliminate their contributions to future rounds of consensus (lines 17 and 18). The weight of the other nodes is then normalized after the faulty nodes are eliminated (lines 19 and 20). A less aggressive policy can also be adopted where instead of eliminating these nodes right away, their weight may be decreased gradually as they misbehave.

---
Algorithm 3 UpdateWeights($\mathcal{H}_i$, {faultySet$_j^{(i)}$}$_{j=1}^{n_i}$) algorithm: updates weights of nodes in $\mathcal{H}_i$
---

1:   consensusFaulty ← { }
2:   for j = 1, . . . , $n_i$ do
3:       suspectWeight$_j^{(i)}$ : hashmap[1, . . . ,|faultySet$_j^{(i)}$|] with values equal to 0 initially
      Phase 1

---

4:       for all $\ell$ s.t. $w_i[\ell]$ > 0 do
5:           $h_\ell^{(i)}$ sends $faultySet_\ell^{(i)}$ to all $h_j^{(i)}$'s
6:       for all $\ell$ s.t. $w_i[\ell]$ > 0 do
7:           $h_j^{(i)}$ receives $faultySet_\ell^{(i)}$ from $h_\ell^{(i)}$
8:           for all for k ∈ $faultySet_\ell^{(i)}$ do
9:               suspectWeight$_j^{(i)}$[k] ← suspectWeight$_j^{(i)}$[k] + $w_i[\ell]$
10:      for all $\ell$ s.t. $w_i[\ell]$ > 0 do
11:          if suspectWeight$_j^{(i)}[\ell]$ ≥ 1/3 then faultySet$_j^{(i)}$ faultySet$_j^{(i)}$ ← faultySet$_j^{(i)}$ ∪ {$\ell$}
      Phase 2

---

// Run King on each of the $h_j^{(i)}$'s to see if they are faulty
12:      for all $\ell$ s.t. $w_i[\ell]$ > 0 do
13:         if $\ell$ ∈ faultySet$_j^{(i)}$ then value ← King($h_j^{(i)}, \mathcal{H}_i, \emptyset$, 1)
14:         else value ← King($h_j^{(i)}, \mathcal{H}_i, \emptyset$, 0)
15:         if (value == 1) then consensusFaulty ← consensusFaulty ∪ {$\ell$}
      Phase 3

---

// Set weight of faulty hospital$_j^{(i)}$'s to 0
16:      totalWeight ← 1
17:      for all $\ell$ ∈ consensusFaulty do
18:         totalWeight ← totalWeight − $w_i[\ell]$
19:         $w_i[\ell]$ ← 0
20:      for all $\ell$ = 1, . . . , $n_i$ do
21:         $w_i[\ell]$ ← $w_i[\ell]$/totalWeight

---

The UpdateRepresentative routine is a simple subroutine, illustrated in Algorithm 4. The UpdateRepresentative routine aims at guaranteeing that the node with the maximum weight is always picked as a leader or representative of its corresponding site. This subroutine will always be executed after the weights are updated.

---
Algorithm 4 UpdateRepresentatives($\mathcal{H}_i, \mathcal{R}_t$) algorithm: updates the set of representatives $\mathcal{R}_{t+1}$ for the next consensus iteration
---

1:      for $\mathcal{H}_i$ ∈ $\mathcal{H}$ do
2:         $\mathcal{R}$[i] ← maxWeight($\mathcal{H}_i$)
      return $\mathcal{R}$

---

The embodiments described herein solve the technological problem of providing a weighted hierarchical consensus mechanism among trusted nodes that decreases the communication overhead versus a traditional BFT consensus mechanism and that allows for more than ⅓ of the node to be faulty due to the weights applied to each node. The grouping of nodes into sites where a weighted BFT consensus mechanism is performed followed by a benign BFT consensus mechanism being performed among the site representatives greatly reduces the communication required in the network. Further, the use of weights allows for more than ⅓ of the nodes to become faulty, thus removing this as a limitation.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of reaching consensus in a blockchain network including a plurality of nodes, the method comprising:
   clustering the plurality of nodes into a plurality of sites;
   randomly selecting a node at each site of the plurality of sites as a representative node;
   initializing a weight for each node;
   receiving, by a first representative node of a first site, a plurality of transactions received by nodes in the first site;
   constructing, by the first representative, a first block including the plurality of transactions;
   performing a weighted consensus mechanism to verify the first block, wherein each of the nodes in the first site participates in a weighted Byzantine Fault Tolerant (BFT) consensus mechanism and wherein the consensus is based upon each node's weight;
   performing a BFT consensus mechanism by the plurality of representatives on the first block;
   updating each node's weight; and
   updating the representative for each site by selecting the node at each site with the highest weight.

2. The method of claim 1, wherein the weighted BFT consensus mechanism further comprises:
   selecting a set of honest nodes such that the set of honest nodes is a minimum number of nodes whose sum of weights exceeds a sum of weights of faulty nodes;
   performing a first phase that produces a preliminary vote for each node at a respective site based upon weighted votes of other nodes at the respective site;
   performing a second phase that produces an intermediate vote for each node at the respective site based upon the weighted preliminary votes of the other node at the respective site; and
   performing a third phase that produces a final vote for the respective site based upon the preliminary votes of the honest nodes.

3. The method of claim 2, further comprising:
   producing a digital signature for the final vote using a decentralized witness cosigning protocol.

4. The method of claim 2, further comprising:
   adding nodes to a faulty set when no message or a message with an incorrect format is received from the added nodes.

5. The method of claim 1, wherein updating each node's weight further comprises:
   performing a first phase, wherein all nodes in the site exchange a list of faulty nodes and then each node updates its list of faulty nodes based upon a suspect weight that is a sum of weights of all nodes listing a node as faulty;
   performing a second phase, wherein all nodes at the site reach an agreement of the set of faulty nodes using the weighted BFT consensus mechanism; and
   performing a third phase that reduces the weights of the nodes in the set of faulty nodes and normalizes the weights of all other nodes.

6. The method of claim 5, wherein reducing the weights of the nodes in the set of faulty nodes includes setting the weights of all nodes in the set of faulty nodes to zero.

7. The method of claim 5, further comprising:
   receiving, by a second representative of a second site, a plurality of transactions received by nodes in the second site;
   constructing, by the second representative, a second block including the plurality of transactions received by the second representative;
   performing the weighted BFT consensus mechanism to verify the second block, wherein each of the nodes in the second site participates in a weighted Byzantine Fault Tolerant (BFT) consensus mechanism and wherein the consensus is based upon each node's weight;
   performing a BFT consensus mechanism by the plurality of representatives on the second block;
   updating each node's weight; and
   updating the representative for each site by selecting the node at each site with the highest weight.

8. The method of claim 7, wherein the weights on each node allow for more than 1/3 of a nodes in the network to be faulty.

9. A non-transitory machine-readable storage medium encoded with instructions for reaching consensus in a blockchain network including a plurality of nodes, comprising:
   instructions for clustering the plurality of nodes into a plurality of sites;
   instructions for randomly selecting a node at each site of the plurality of sites as a representative;
   instructions for initializing a weight for each node;
   instructions for receiving, by a first representative of a first site, a plurality of transactions;
   instructions for constructing, by the first representative node, a first block including the plurality of transactions received by the first representative;
   instructions for performing a weighted consensus mechanism to verify the first block, wherein all nodes in the first site participate in a weighted Byzantine Fault Tolerant (BFT) consensus mechanism based upon each node's weight;
   instructions for performing a BFT consensus mechanism by the plurality of representatives on the first block;
   instructions for updating each node's weight; and
   instructions for updating the representative for each site by selecting the node at each site with the highest weight.

10. The non-transitory machine-readable storage medium of claim 9, wherein the weighted BFT consensus mechanism further comprises:
    instructions for selecting a set of honest nodes such that the set of honest nodes is a minimum number of nodes whose sum of weights exceeds a sum of weights of faulty nodes;
    instructions for performing a first phase that produces a preliminary vote for each node at a respective site based upon weighted votes of other nodes at the respective site;
    instructions for performing a second phase that produces an intermediate vote for each node at the respective site based upon the weighted preliminary votes of the other nodes at the respective site; and
    instructions for performing a third phase that produces a final vote for the respective site based upon the preliminary votes of the honest nodes.

11. The non-transitory machine-readable storage medium of claim 10, further comprising:
    instructions for producing a digital signature for the final vote using a decentralized witness cosigning protocol.

12. The non-transitory machine-readable storage medium of claim 10, further comprising:

instructions for adding nodes to a faulty set when no message or a message with an incorrect format is received from the added nodes.

13. The non-transitory machine-readable storage medium of claim 9, wherein the instructions for updating each node's weight further comprises:
   instructions for performing a first phase, wherein all nodes in the site exchange a list of faulty nodes and then each node updates its list of faulty nodes based upon a suspect weight that is a sum of weights of all nodes listing a node as faulty;
   instructions for performing a second phase, wherein all nodes at the site reach an agreement of the set of faulty nodes using the weighted BFT consensus mechanism; and
   instructions for performing a third phase that reduces the weights of the nodes in the set of faulty nodes and normalizes the weights of all other nodes.

14. The non-transitory machine-readable storage medium of claim 13, wherein reducing the weights of the nodes in the set of faulty nodes includes setting the weights of all nodes in the set of faulty nodes to zero.

15. The non-transitory machine-readable storage medium of claim 13, further comprising:
   instructions for constructing, by the second representative, a second block including the plurality of transactions received by the second representative;
   instructions for performing the weighted BFT consensus mechanism to verify the second block, wherein each of the nodes in the second site participates in a weighted Byzantine Fault Tolerant (BFT) consensus mechanism and wherein the consensus is based upon each node's weight;
   instructions for performing a BFT consensus mechanism by the plurality of representatives on the second block;
   instructions for updating each node's weight; and
   instructions for updating the representative for each site by selecting the node at each site with the highest weight.

16. The non-transitory machine-readable storage medium of claim 9, wherein the weights on each node allow for more than ⅓ of all nodes in the network to be faulty.

17. A system for reaching consensus in a blockchain network including a plurality of nodes, comprising:
   means for clustering the plurality of nodes into a plurality of sites;
   means for randomly selecting a node at each site of the plurality of sites as a representative node;
   means for initializing a weight for each node;
   means for receiving, by a first representative node of a first site, a plurality of transactions received by nodes in the first site;
   means for constructing, by the first representative, a first block including the plurality of transactions;
   means for performing a weighted consensus mechanism to verify the first block, wherein each of the nodes in the first site participates in a weighted Byzantine Fault Tolerant (BFT) consensus mechanism and wherein the consensus is based upon each node's weight;
   means for performing a BFT consensus mechanism by the plurality of representatives on the first block;
   means for updating each node's weight; and
   means for updating the representative for each site by selecting the node at each site with the highest weight.

18. The system of claim 17, wherein the weighted BFT consensus mechanism further comprises:
   means for selecting a set of honest nodes such that the set of honest nodes is a minimum number of nodes whose sum of weights exceeds a sum of weights of faulty nodes; performing a first phase that produces a preliminary vote for each node at a respective site based upon weighted votes of other nodes at the respective site;
   means for performing a second phase that produces an intermediate vote for each node at the respective site based upon the weighted preliminary votes of the other nodes at the respective site; and
   means for performing a third phase that produces a final vote for the respective site based upon the preliminary votes of the honest nodes.

19. The system of claim 18, further comprising:
   means for producing a digital signature for the final vote using a decentralized witness cosigning protocol.

20. The system of claim 18, further comprising:
   means for adding nodes to a faulty set when no message or a message with an incorrect format is received from the added nodes.

21. The system of claim 17, wherein the means for updating each node's weight further comprises:
   means for performing a first phase, wherein all nodes in the site exchange a list of faulty nodes and then each node updates its list of faulty nodes based upon a suspect weight that is a sum of weights of all nodes listing a node as faulty;
   means for performing a second phase, wherein all nodes at the site reach an agreement of the set of faulty nodes using the weighted BFT consensus mechanism; and
   means for performing a third phase that reduces the weights of the nodes in the set of faulty nodes and normalizes the weights of all other nodes.

22. The system of claim 21, wherein the means for reducing the weights of the nodes in the set of faulty nodes includes means for setting the weights of all nodes in the set of faulty nodes to zero.

23. The system of claim 21, further comprising:
   means for receiving, by a second representative of a second site, a plurality of transactions received by nodes in the second site;
   means for constructing, by the second representative, a second block including the plurality of transactions received by the second representative;
   means for performing the weighted BFT consensus mechanism to verify the second block, wherein each of the nodes in the second site participates in a weighted Byzantine Fault Tolerant (BFT) consensus mechanism and wherein the consensus is based upon each node's weight;
   means for performing a BFT consensus mechanism by the plurality of representatives on the second block;
   means for updating each node's weight; and
   means for updating the representative for each site by selecting the node at each site with the highest weight.

24. The system of claim 17, wherein the weights on each node allow for more than ⅓ of all nodes in the network to be faulty.

* * * * *